UNITED STATES PATENT OFFICE.

JOHN W. HOARD AND FREDERICK R. HOARD, OF PROVIDENCE, R. I.

PAINT AND VARNISH.

SPECIFICATION forming part of Letters Patent No. 334,019, dated January 12, 1886.

Application filed October 21, 1884. Serial No. 146,112. (Specimens.)

*To all whom it may concern:*

Be it known that we, JOHN W. HOARD and FREDERICK R. HOARD, of Providence, in the county of Providence and State of Rhode Island, have invented certain new and useful Improvements in Paints and Varnishes; and we do hereby declare that the following is a full, clear, and exact description of the invention, which will enable others skilled in the art to which it appertains to make and use the same, reference being had to the accompanying drawings, and to letters of reference marked thereon, which form a part of this specification.

In the manufacture of oil-paints in which linseed-oil is used, this oil is used either raw or boiled, and in either of these states it has no special consistence or body, and paints thus made to a considerable degree soak into and are absorbed by the pores of wood or other article to which they are applied, thus consuming a considerable quantity of the paint in excess of that needed upon the surface.

Oils in their natural state have no body, whereby when applied to the surface of articles they can give gloss and finish, and they have not a gummy or varnish-like character, which would prevent their sinking into the pores or fibers of the article to which they may be applied. Again, ordinarily, a groundwork or preparatory priming-coat, usually of a cheaper kind of paint, is needed in order to prepare the surface of the article for the final or more finished coat, as also to prevent the absorption of the final coat into the pores of the article. This involves double labor and much expense.

In paints usually the oxide of lead or other oxide is used as the body, and then this is thinned down to the proper consistence with linseed or other oil and spirits of turpentine, one or both. This oxide of lead is comparatively much the more expensive element of ordinary paint, and although the valuable qualities of lead-paints—viz., their durability and water-proof character—are due principally, if not totally, not to the oxide of lead, but to the linseed-oil used in their composition, yet, heretofore no method has been known of obtaining these valuable properties of linseed or equivalent oil in a paint without the use of this comparatively expensive and otherwise almost or quite useless oxide of lead or equivalent material for the purpose of holding the oil while it is drying or oxidizing by exposure to the atmosphere.

Our invention has for its object the furnishing of a substitute for and improvement upon ordinary lead and oil paints and for protecting and preserving articles of all kinds, including ships' bottoms and other bodies exposed to the action of air or of salt or fresh water, and which dispenses with the use of oxide of lead or equivalent substance as a body, which presents the durability and water-proof character of the ordinary lead and oil paints, possessing these qualities, as we believe, in a much higher degree, and which has an elasticity rendering it very little liable to crack under exposure to the weather and to changes of temperature, which admits of being spread over a surface from two to three times as large as can be painted with an equal quantity of linseed-oil paint as usually made, which penetrates very slightly and almost imperceptibly into the body of the articles painted with it, adhering almost exclusively to their outer surface and requiring no preparatory or under coating, which needs no gums, resins, or varnishes to give it a gloss, and which is liable to but slight oxidization after it has been applied.

As we have said, we dispense altogether with oxide of lead or similar substance in our new invention, but use as the main material or substance of our paint linseed or equivalent oil highly oxidized throughout its mass, which we oxidize by any known process capable of producing the necessary high degree of oxidization required, but preferably by that described in our Patent No. 312,351, dated February 17, 1885, by passing and repassing the oil by the agency of a blast of air through an atomizer within the vessel containing the liquid under treatment, and we oxidize it to any degree of consistence (short of a solid substance or gum) desired and suitable as a body for paint.

We find that it is necessary for our purpose to carry the oil to a very high state of oxidization, approaching its final and complete state of oxidization into a gum; that no satisfactory results can be obtained unless the oil is oxidized to a consistence about equal to that of ordinary paint in the condition in which it is commonly applied, and that practically it is preferable, and that the qualities of the paint are improved by carrying the process of oxidizing the oil to still higher degrees, and preferably to a condition very close to but just short of the gum, as we find that if the oil has become too thick for application it may readily, at any stage short of the gum, be reduced to any consistence desired by the addition of spirits of turpentine or equivalent material. The material, thus thinned down, if necessary, is now ready for application to all surfaces in which a change of color is not desired. Where a change of color, however, is desired, we simply stain this body of oxidized oil to the required shade with any desired pigment or coloring material, thereby constituting a paint in the stricter sense of that term. The proportion of coloring-matter relatively to the oxidized oil required to constitute this paint must of course vary with the depth or shade of color desired, and, indeed, upon what color is wanted in a particular case.

We have found that good effects have been produced by using a half pound or less of coloring material for, say, ten gallons of the oxidized oil.

It will be observed that by our invention the oxidization of the oil is effected in the manufacture of the paint and before it is applied, and we do not, therefore, as in ordinary oil-painting, rely on the after exposure, and for a time to the atmosphere, for oxidizing the mere outer surface of the paint after it has been applied, thus giving a mere external skin to it. On the contrary, the whole mass of our paint is highly and almost completely oxidized before using it, so that in our invention we have not only all the advantages which ordinary oil-paints have in the nature of a waterproof varnish because of the exposure to the air of the outer surface of such ordinary paint with the oil therein contained upon an article painted with it, but also the added advantage that this varnish-like and water-proof character pertains to the whole body of our paint, as well to that portion which is in immediate contact with the wood, paper, metal, or other material to which it is applied as to that which is directly exposed to the atmosphere. Its gummy character is, as we believe, that which substantially prevents or precludes its penetration into the articles painted with it, so that but little of this paint is needed as compared with others.

We find that even thin paper, when coated with our improved paint does not indicate any material consumption of paint by its penetration into or absorption by the paper.

As our improved paint does not on drying become non-elastic like other paints, it is valuable for coating the bottoms of ships and vessels, not only to prevent damage from water, &c.; but also to prevent the attachment of barnacles, as it is generally understood that they will adhere only to unyielding or non-elastic surfaces, and will therefore not be attracted to vessels having our elastic paint applied to that part of the hull which lies in the water.

In brief, our oxidized oil, constituting the body of our paint, is itself, in fact, a resinous or gum-like liquid. A single coat of it on white-pine wood leaves a gloss about equal to two coats of ordinary varnish, and without the addition of pigments or coloring material it may be used as a very desirable varnish or finish on substances, whether previously painted or not.

We are aware that oils have been boiled for use in making printer's inks and varnishes, and in this way or by the exposure during the process perhaps very slightly oxidized; but the oil, which is the principal substance or base of our paint, is oxidized to a very high degree throughout its whole mass before the paint is used, so as to have substantially a uniform character of high oxidization throughout, thereby preventing an unequal change of character, as it admits of but little further change by oxidization from exposure after having been applied as a paint.

We claim—

1. The above-described varnish, finish, or base or body for paint, composed of linseed or equivalent oil highly oxidized throughout its mass.

2. A paint, substantially as above described, having a main material or body of linseed or equivalent oil highly oxidized throughout its mass, and a suitable pigment or coloring material in combination therewith.

JOHN W. HOARD.
FREDERICK R. HOARD.

Witnesses:
HENRY B. ROSE,
EDWARD B. BIGELOW.